(12) United States Patent
Kang et al.

(10) Patent No.: US 7,929,665 B2
(45) Date of Patent: Apr. 19, 2011

(54) X-RAY IMAGE OBTAINING/IMAGING APPARATUS AND METHOD

(75) Inventors: Dong-Goo Kang, Suwon-si (KR); Young Hun Sung, Hwaseong-si (KR); Jong Ha Lee, Hwaseong-si (KR); Sung Su Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 183 days.

(21) Appl. No.: 12/453,117

(22) Filed: Apr. 29, 2009

(65) Prior Publication Data

US 2010/0135463 A1    Jun. 3, 2010

(30) Foreign Application Priority Data

Dec. 2, 2008   (KR) .................... 10-2008-0121079

(51) Int. Cl.
*H05G 1/64*    (2006.01)
(52) U.S. Cl. ................................ 378/98.8; 250/370.11
(58) Field of Classification Search ................. 378/98.8; 250/370.08, 370.09, 370.11
See application file for complete search history.

(56) References Cited

FOREIGN PATENT DOCUMENTS

| JP | 2000-298198 | 10/2000 |
|---|---|---|
| JP | 2003-000578 | 1/2003 |
| JP | 2007-093376 | 4/2007 |
| KR | 10-0640251 | 10/2006 |

*Primary Examiner* — Courtney Thomas
(74) *Attorney, Agent, or Firm* — Staas & Halsey LLP

(57) ABSTRACT

An X-ray image obtaining/imaging apparatus and method. An X-ray image may be obtained using an X-ray sensor that is divided into pixel blocks including a plurality of pixels. Each pixel may respectively include a scintillator layer, with the scintillator layers having differing characteristics.

46 Claims, 9 Drawing Sheets

X-RAY IMAGE OBTAINING/IMAGING APPARATUS AND METHOD

CROSS-REFERENCE TO RELATED APPLICATIONS

This application claims the benefit of Korean Patent Application No. 10-2008-0121079, filed on Dec. 2, 2008, in the Korean Intellectual Property Office, the disclosure of which is incorporated herein by reference

BACKGROUND

1. Field

One or more embodiments relate to an X-ray image obtaining apparatus and method, and an imaging apparatus and method, and more particularly, to an X-ray obtaining apparatus and method with increased contrast of an X-ray image and the like, and an X-ray image obtaining apparatus and an imaging apparatus and corresponding methods.

2. Description of the Related Art

X-rays are electromagnetic radiation with high permeability, and which have wavelengths within a range between gamma rays and ultraviolet rays. When X-rays are radiated to an object, an X-ray image has conventionally been generated based on a principle that the X-ray absorption permeability varies depending on a material constituting the observed object and thickness of the same object. X-ray images may be used for medical purposes, security checks, nondestructive testing, and the like, for example.

SUMMARY

According to one or more embodiments, there is provided an X-ray image obtaining apparatus, the apparatus including a sensor unit including a scintillator panel to generate light upon incidence of at least one X-ray, the sensor unit being divided into pixel blocks including a plurality of pixels, the scintillator panel includes a plurality of scintillator layers respectively corresponding to the plurality of pixels, and the scintillator layers have differing layer characteristics, and an image generating unit to generate a plurality of first X-ray images using an electronic signal transduced from the light, and generate a second X-ray image based on the plurality of first x-ray images.

The X-ray may include at least one of a monochromatic X-ray, a narrow band X-ray, and a polychromatic X-ray.

In addition, the differing layer characteristics may include at least one of thickness of the scintillator layer and a type of material of the scintillator layer.

Still further, the material of the scintillator layer may include at least one of CsI, CsI (Tl), Gd2O2S(Tb), Gd2O2S (Eu), Y2O2S(Eu), Y2O3(Eu), and a material containing garnet.

The at least one X-ray may include plural X-rays with different energy levels, and the plurality of first X-ray images respectively correspond to the plural X-rays. The plurality of pixels may respectively correspond to the plural X-rays, and a layer characteristic of each of the plurality of scintillator layers may be configured to correspond to an energy level of an X-ray incident to a respective pixel. Similarly, the plurality of pixels may respectively correspond to the plural X-rays, and the image generating unit may generate a first X-ray image based on an electronic signal derived from a pixel corresponding to a respective X-ray incident to the pixel.

Further, the plurality of pixels may respectively correspond to the plural X-rays, and the image generating unit may generate a first X-ray image based on an electronic signal derived from a pixel corresponding to a respective X-ray incident to the pixel and an electronic signal derived from an adjacent pixel, adjacent to the pixel, corresponding to a respective X-ray incident to the adjacent pixel.

The apparatus may further include a radiation unit to radiate the at least one X-ray toward an object, wherein the scintillator panel generates light upon incidence of the at least one X-ray after irradiation of the object by the at least one X-ray. The radiation unit may sequentially radiate the at least one X-ray, with the radiated X-ray being in either a cone-beam shape or a fan-beam shape. Further, the radiation unit may simultaneously radiate the plural X-rays, with the radiated plural X-rays being in a fan-beam shape.

The radiation unit may further radiate the at least one X-ray along a plurality of angles centered on the object.

In addition, the at least one X-ray may include a single polychromatic X-ray, and the plurality of pixels respectively correspond to the plurality of first X-ray images.

According to one or more embodiments, there is provided an X-ray image obtaining apparatus, the apparatus including a radiation unit to radiate X-rays toward an object, the radiation unit including a first radiation unit to radiate a plurality of first X-rays and a second radiation unit to radiate a polychromatic X-ray, a sensor unit to detect the X-rays after irradiation of the object, the sensor unit including a first scintillator panel divided into pixel blocks including a plurality of pixels and a second scintillator panel, the second scintillator panel having even thicknesses for adjacent pixels, the first scintillator panel and the second scintillator panel including a plurality of scintillator layers respectively corresponding to each respective plurality of pixels, and the scintillator layers having differing layer characteristics, and an image generating unit to generate an X-ray image of the object using the detected X-rays.

According to one or more embodiments, there is provided an electromagnetic radiation sensing apparatus for obtaining an X-ray image, including a plurality of divided pixel blocks including a plurality of pixels, each of the plurality of pixels including a scintillator layer, a first scintillator layer, included in a first pixel of the plurality of pixels, to generate light from an incident first electromagnetic emission spectrum, and a second scintillator layer, included in a second pixel of plurality of pixels, to generate light from an incident second electromagnetic emission spectrum.

According to one or more embodiments, there is provided an electromagnetic radiation sensing apparatus for obtaining an X-ray image, including a plurality of divided pixel blocks including a plurality of pixels, each of the plurality of pixels including a scintillator layer to generate light upon incidence of at least one X-ray, the scintillator panel including a plurality of scintillator layers respectively corresponding to the plurality of pixels, and the scintillator layers have differing layer characteristics of at least one of thickness of respective scintillator layers and type of materials of the respective scintillator layers.

According to one or more embodiments, there is provided an X-ray image obtaining apparatus, the apparatus including such a sensor unit, generating at least one first X-ray image from a transducing of light generated from the respective scintillator layers upon incidence of the at least one X-ray, and an image generating unit to generate at least one second X-ray image based the at least one first X-ray image.

According to one or more embodiments, there is provided an imaging apparatus, including a radiation unit to radiate at least one electromagnetic radiation spectrum, and a sensor, to sense the at least one radiated electromagnetic radiation ray, divided into pixel blocks including a plurality of pixels, each of the plurality of pixels includes a scintillator layer, with a first pixel of the plurality of pixels including a first scintillator layer that generates light upon incidence of a first electromagnetic radiation spectrum, and a second pixel of the plurality of pixels including a second scintillator that generates light upon incidence of a second electromagnetic radiation spectrum.

According to one or more embodiments, there is provided a method for obtaining an X-ray image, the method including generating at least one X-ray signal based on light generated from a scintillator panel divided into pixel blocks including a plurality of pixels respectively corresponding to each of plural scintillator layers of the scintillator panel having differing layer characteristics, generating a plurality of first X-ray images based on the generated at least one X-ray signal, and generating a second X-ray image based on the plurality of first X-ray images.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
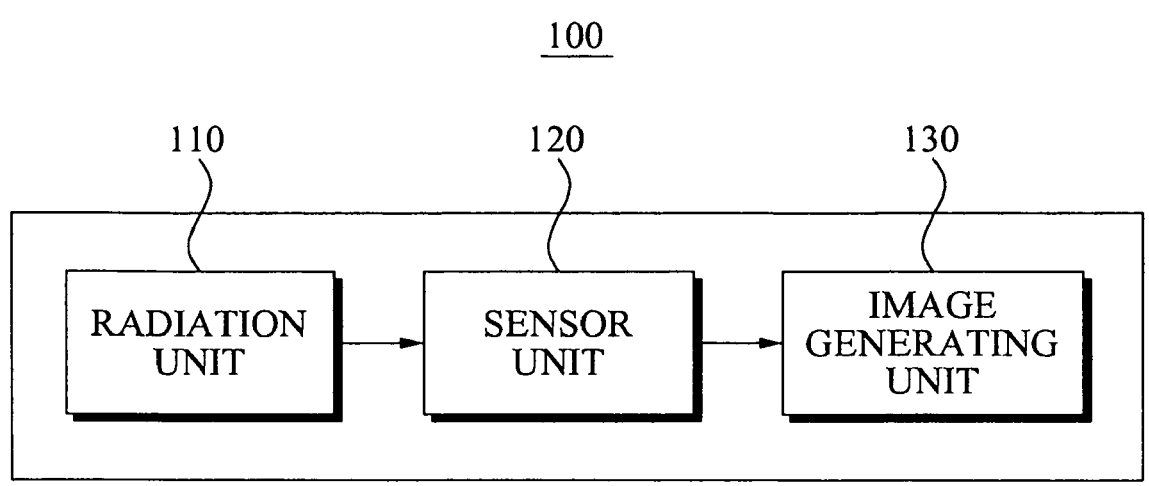
FIG. 1 illustrates an X-ray image obtaining apparatus, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an X-ray image obtaining apparatus, according to one or more embodiments. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or correspondingly implemented through a distributed network, noting that additional and alternative embodiments are available.

The X-ray image obtaining apparatus 100, according to one or more embodiments, may include a radiation unit 110, a sensor unit 120, and an image generating unit 130, for example.

In an embodiment, the X-ray image obtaining apparatus 100 may obtain an X-ray image of an object using a plurality of X-rays having different energy levels. According to additional and/or alternative embodiments, the X-ray image obtaining apparatus 100 may obtain the X-ray image of the object using a single polychromatic X-ray. Hereinafter, noting that alternative embodiments are available, the obtaining the X-ray image of the object using a plurality of X-rays having different energy levels and the obtaining the X-ray image of the object using the single polychromatic X-ray will be separately described.

In an example, obtaining the X-ray image of the object using the plurality of X-rays having different energy, the radiation unit 110 may radiate the plurality of X-rays having different energy levels to penetrate the object.

According to one or more embodiments, the X-ray may include at least one of a monochromatic X-ray, a narrow band X-ray, and a polychromatic X-ray, as only examples.

To obtain the X-ray image, in an embodiment, a single polychromatic X-ray may generally be used. However, when the X-ray image is obtained by using the polychromatic X-ray, the contrast of the image is decreased, and thereby a portion of the object may be result in observable poor quality, such as when eventually displayed, according to one or more embodiments.

Accordingly, the X-ray image obtaining apparatus 100, according to one or more embodiments, may obtain the X-ray image using a plurality of monochromatic X-rays having a predetermined energy and/or a plurality of narrow band X-rays having a predetermined energy, so as to increase the contrast of the image. In this instance, the plurality of monochromatic X-rays having a predetermined energy or the plurality of narrow bands having the predetermined energy may, again, have different energy levels. That is, the X-ray image can be obtained using a multi-energy X-ray.

The narrow band X-ray is an X-ray having Full Width at Half Maximum (FWHM) equal to or less than a certain amount of energy (e.g. 20 keV), with an energy level of the narrow band X-ray being an average energy of all the narrow band X-rays.

According to one or more embodiments, the radiation unit 110 may include a radiation source to radiate white light and a filter for obtaining the monochromatic X-ray or the narrow band X-ray having single energy from the radiation source. As an example, the filter for obtaining the monochromatic X-ray or the narrow band X-ray may be a monochromatic X-ray filter using Bragg's law, again noting that alternative embodiments are available.

Also, according to one or more embodiments, the X-ray image obtaining apparatus 100 may obtain the X-ray image using a plurality of polychromatic X-rays having different energy levels. In this instance, although the contrast of the X-ray image may be lowered, e.g., compared with a case of obtaining the X-ray image using the monochromatic or narrow band X-ray, an X-ray image with a contrast higher than the X-ray image obtaining apparatus using the single polychromatic X-ray may be obtained through a layer characteristic of a scintillator panel which will be described below. An energy level of the polychromatic X-ray may further indicate an average energy level of the polychromatic X-rays.

An X-ray radiated via the radiation unit 110 may penetrate the object and be detected by the sensor unit 120.

In one or more embodiments, the sensor unit 120 may include a scintillator panel that converts a plurality of X-rays that penetrate the object into measureable light, i.e., measureable light may be generated by the scintillator panel upon incidence by the X-ray. As an example, scintillator may be a fluorescence material that radiates light upon incidence of radiation.

In this instance, the sensor unit 120 may be divided into pixel blocks including a plurality of pixels, the scintillator panel may further include a plurality of scintillator layers respectively corresponding to a plurality of pixels, with the scintillator layers having differing layer characteristics.

In such an embodiment, a single pixel block corresponds to a single pixel in the X-ray image. That is, according to one or more embodiments, the number of pixel blocks corresponds to the number of pixels of the X-ray image.

Thus, here, in this embodiment, each pixel includes a scintillator layer. Also, the pixel may further include a photoelectric transducer, as described below.

Herein, the layer characteristic means a physical or chemical characteristic of the layer. For an example, as the physical characteristic, there may be included a thickness (depth) of a scintillator layer, a width (extent) of a scintillator layer, and the like. Also, as the chemical characteristic, there may be included a type of material constituting the scintillator layer, and the like.

According to one or more embodiments, the layer characteristic includes at least one of the thickness of the scintillator layer and the type of material making up the scintillator layer.

In an embodiment, each of the scintillator layers included in the plurality of the pixels may be made up of the same materials, and may have different thicknesses.

In another embodiment, each of the scintillator layers included in the plurality of the pixels may be made up of different materials and may have the same thickness.

Further, each of the scintillator layer included in the plurality of the pixels may be made up of different materials, and may have different thicknesses.

According to one or more embodiments, example materials making up the scintillator layer may include at least one of CsI, CsI (Tl), $Gd_2O_2S(Tb)$, $Gd_2O_2S(Eu)$, $Y_2O_2S(Eu)$, $Y_2O_3$ (Eu), and a material containing garnet, noting that embodiments are not limited thereto.

According to one or more embodiments, the herein described plurality of pixels respectively correspond to plurality of X-rays, and a layer characteristic of each of the plurality of scintillator layers may be determined based on an energy level of an X-ray corresponding to each of the pixels.

When the thickness of the scintillator layer is excessively thick, conversion of the radiation into light may be completed within the scintillator layer, and in this instance, when the light penetrates the scintillator, the light may be diffused. Conversely, when the thickness of the scintillator layer is relatively thin, conversion into light may not be completed. Accordingly, in one or more embodiments, the scintillator layer may have an appropriate thickness based on the appropriate/desired energy level of the radiation.

That is, according to one or more embodiments, at least one of the thickness of the scintillator layer and the type of materials making up the scintillator layer may be determined based on the energy level of the X-ray. As an example, the thickness of the respective scintillator layer may be proportional to the energy level of the X-ray. As an example, as the energy of the X-ray increases, the appropriate thickness of the scintillator layer may increase.

Also, in one or more embodiments, since the materials making the scintillator layer may have different attenuation characteristics depending on an energy level of an incident X-ray, the materials making the scintillator layer should be appropriate for the energy level of the incident radiation.

Accordingly, in such an embodiment, when each scintillator layer included in the plurality of the pixels may have a thickness appropriate for an energy level of each of the plurality of X-rays, and be made up of materials appropriate for the energy level of each of the plurality of X-rays, the contrast of the X-ray image may be increased.

Hereinafter, as only an example, a scintillator panel according to one or more embodiments will be described in detail with reference to FIG. 2.

Figure 2:
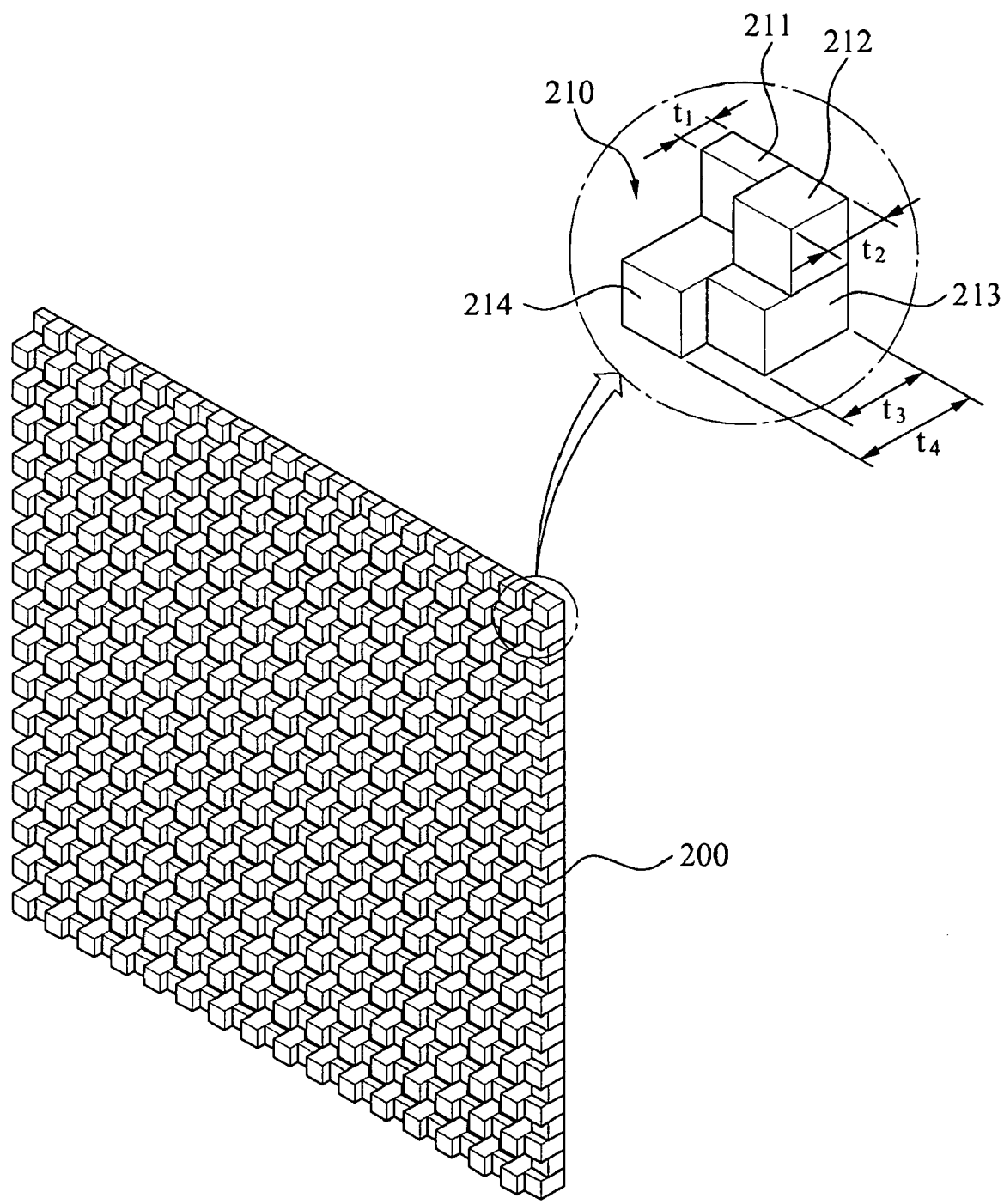
FIG. 2 illustrates a scintillator panel, according to one or more embodiments.

FIG. 2 illustrates such an example scintillator panel, according to one or more embodiments.

The scintillator panel 200 may be divided into a plurality of layer blocks 210. In addition, each of the layer blocks may be made to include a plurality of layers 211 through 214.

Here, in the following example, it may be assumed that the scintillator panel 200 is made up of the same material, and all the plurality of layer blocks 210 have the same configuration.

Here, although it is assumed that the layer block 210 is made up of arrays, each of the arrays having a size of 2×2 and include four layers 211 through 214, the layer block 210 may include another certain number of layers and also the size of the array may be variable, thus alternative embodiments are available.

In addition, depending on embodiment, here four monochromatic X-rays (the X-rays are referred to as a first monochromatic X-ray, a second monochromatic X-ray, a third monochromatic X-ray, and a fourth monochromatic X-ray, respectively, with an energy level of each of the X-rays being represented by E1, E2, E3, and E4, respectively) are used for obtaining an X-ray image, and the four monochromatic X-rays may, thus, be converted into a measureable ray, such as a visible ray of light, by the scintillator panel in FIG. 2.

Since a plurality of layers may respectively correspond to a plurality of monochromatic X-rays, the layers 211 through 214 may correspond to the first monochromatic X-ray through the fourth monochromatic X-ray, respectively. That is, the layer 211 may be the layer to convert the first monochromatic layer into a first measureable ray. In the same manner, the layer 212 may be the layer to convert the second monochromatic X-ray into a second measureable ray, the layer 213 may be the layer to convert the third monochromatic X-ray into a third measureable ray, and the layer 214 may be the layer to convert the fourth monochromatic X-ray into a fourth measureable ray. Obviously, in this embodiment, the first monochromatic X-ray may be converted into a measureable ray by the layers 212 through 214, however, further detailed descriptions thereof will be omitted in FIG. 2.

The first measureable ray through the fourth measureable ray may have different energy spectrums, e.g., each ray may have different energy spectrums from each other. Conversely, depending on embodiment, the first measureable ray through the fourth measureable ray may have the same energy spectrum. In other words, when the first monochromatic X-rays through fourth monochromatic X-rays have different energy levels, the first measureable ray through the fourth measureable ray may have different energy levels or may have the same energy level, for example.

When the first monochromatic X-ray is used, an X-ray image(1) may be generated by using a light value of the layer 211. In the same manner, when the second monochromatic X-ray is used, a light value of the layer 212 may be used to generate an X-ray image(2), when the third monochromatic X-ray is used, a light value of the layer 213 may be used to generate an X-ray image(3), and when the fourth monochromatic X-ray is used, a light value of the layer 214 may be used to generate an X-ray image(4). Here, though four layers have been described, embodiments of the present invention are not limited thereto.

As described below, an X-ray image obtaining apparatus, according to one or more embodiments, may obtain a final X-ray image using different generated X-ray images, for example.

As illustrated in FIG. 2, in this embodiment, the layer 211 through the layer 214 have thicknesses $t_1$ through $t_4$, respectively. In this instance, $t_1$ through $t_4$ may be based on the respective energy level (E1 through E4) of the example monochromatic X-ray. In addition, as described above, $t_1$ through $t_4$ may be proportional to the energy level of the monochromatic X-ray (E1 through E4). Since thicknesses of the example scintillator layers have a relationship of $t_1<t_2<t_3<t_4$, the energy levels of the monochromatic X-ray has a relationship of E1<E2<E3<E4.

Referring again to FIG. 1, an X-ray image obtaining apparatus 100, according to one or more embodiments will now be further described.

According to one or more embodiments, the sensor unit 120 may include a photoelectric transducer. Such a photoelectric transducer may convert light into an electronic signal.

Hereinafter, a relationship between the scintillator panel and the photoelectric transducer according to one or more embodiments will be described in detail with reference to FIG. 3.

Figure 3:
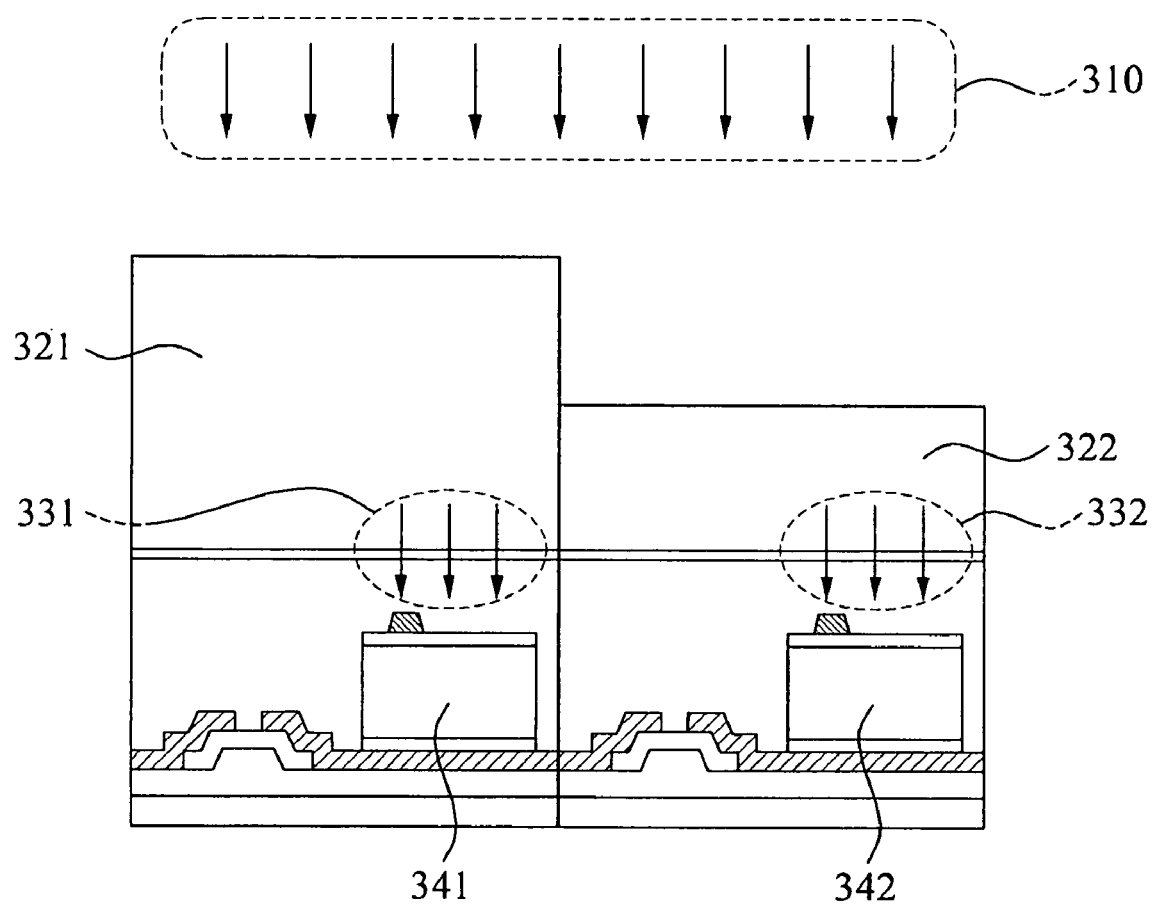
FIG. 3 illustrates a sensor unit, according to one or more embodiments.

FIG. 3 illustrates a sensor unit aspect according to one or more embodiments.

Pixel blocks of the sensor unit are illustrated in FIG. 3. Although FIG. 3 illustrates that a pixel block includes two pixels, the pixel block may also be made to include four pixels arranged in an array form having a size of 2×2, for example, and also may be made to include a different number of pixels, i.e., differing embodiments with differing numbers of pixels and pixel blocks are available. In this example, a pixel includes scintillator layers 321 and 322, which are portions of the scintillator panel. In FIG. 3, in this example, it may be assumed that each of the scintillator layers 321 and 322 included in the pixel are made of the same material and have different thicknesses, again noting that alternative embodiments are available.

An X-ray 310 that penetrates an object, for example, may be received at the layers 321 and 322 included in the sensor unit. The X-ray 310 that reacts with the scintillator layer 321 is converted into the shown light 331, and the X-ray 310 that reacts with the scintillator layer 322 is converted into the shown light 332. As described above, the lights 331 and 332 may have different energy levels or may have the same energy level.

Photoelectric transducers 341 and 342 may be used to convert the lights 331 and 332 into electronic signals, and may be arranged below the scintillator layers 321 and 322. In this embodiment, the photoelectric transducer 341 converts the light 331 into an electronic signal, and the photoelectric transducer 342 converts the light 332 into another electronic signal, noting that alternative embodiments are available.

In this example, the photoelectric transducers 341 and 342 may be photodiodes, which may also be Positive-Intrinsic-Negative (PIN) diodes, again noting that alternative embodiments are available.

For example, the photoelectric transducers 341 and 342 may be photon counting pixel detectors. As still only another example, change-coupled device (CCD) detector, e.g., including a lens, may also be used as the photoelectric transducers 341 and 342.

Referring again to FIG. 1, the X-ray image obtaining apparatus 100, according to one or more embodiments will now be further described.

An image generating unit 130 may generate a plurality of first X-ray images respectively corresponding to a plurality of X-rays using electronic signals converted from the aforementioned light, and may generate a second X-ray image using the plurality of the first X-ray images.

As described above, in an embodiment, the X-ray image obtaining apparatus 100 may obtain an X-ray image of an example object using a plurality of X-rays having different energy levels. In this instance, the first X-ray image may correspond to a single X-ray from among the plurality of the X-rays. That is, a single X-ray image may be generated corresponding to the respective single X-ray. Accordingly, in an embodiment, the number of the plurality of X-rays may be the same as the number of generated first X-ray images.

The image generating unit 130 may further generate the second X-ray image using the plurality of generated first X-ray images, with second X-ray image being an X-ray image intended to be obtained of the object, according to one or more embodiments, noting that alternative embodiments are available.

In this example, the image generating unit 130 may select a single, for example, first X-ray image from among the plurality of first X-ray images, and may use the selected first X-ray image as the second X-ray image, thereby outputting the selected first X-ray image of the object as the output X-ray image.

In addition, the image generating unit 130 may select one or more first X-ray images from among the plurality of first X-ray images, and combine the selected one or more first X-ray image to generate the second X-ray image.

Still further, the image generating unit 130 may select one or more first X-ray images from among the plurality of first X-ray images, and may use difference images derived from the selected one or more first X-ray images as the second X-ray image, and thereby output the X-ray image of the object based on the derived difference images.

Also, according to one or more embodiments, the image generating unit 130 may include an electronic circuit to process an electronic signal converted from light. In an embodiment, the electronic circuit may be a thin film transistor (TFT), for example, with the electronic signal converted from the light being readout by the TFT.

According to one or more embodiments, a plurality of pixels may respectively correspond to a plurality of X-rays, and the image generating unit 130 may generate the first X-ray images based on an electronic signal of a pixel corresponding to each of the X-rays.

That is, when a single X-ray from among the plurality of X-rays has a predetermined energy level (e.g. E1), the image generating unit 130 may obtain the first X-ray image of the object based on an electronic signal obtained from a particular pixel (e.g. a pixel included in the layer 211 of FIG. 2) corresponding to the single X-ray, for example.

Also, according to one or more embodiments, the plurality of pixels may respectively correspond to the plurality of X-rays, and the image generating unit 130 may generate the first X-ray images based on an electronic signal of a particular respective pixel corresponding to each of the X-rays and electronic signals of pixels adjacent to the pixel corresponding to each of the X-ray.

That is, the image generating unit 130 may obtain the first X-ray image of the object using the electronic signal of the pixel corresponding to each of the radiated X-rays, and may also use the electronic signals of the pixels adjacent to the pixel corresponding to each of the X-ray, such as the pixels being vertically, horizontally, and/or diagonally in contact or adjacent with the pixel corresponding to each of the X-rays. In this instance, a single pixel value and other adjacent pixel values may be used for generating the first X-ray image, and thus an X-ray image with high sensitivity and high contrast may be generated.

According to one or more embodiments, the radiation unit 110 sequentially radiates the plurality of X-rays, and the radiated X-rays may be in either cone-beam shapes or fan-beam shapes, noting that alternative embodiments are available.

Also, according to one or more embodiments, the radiation unit 110 may simultaneously radiate the plurality of X-rays, with the radiated X-rays may being fan-beam shapes, again noting that alternative embodiments are available.

Hereinafter, the radiation unit according to one or more embodiments will be described in further detail with reference to FIGS. 4 through 6.

Figure 4:
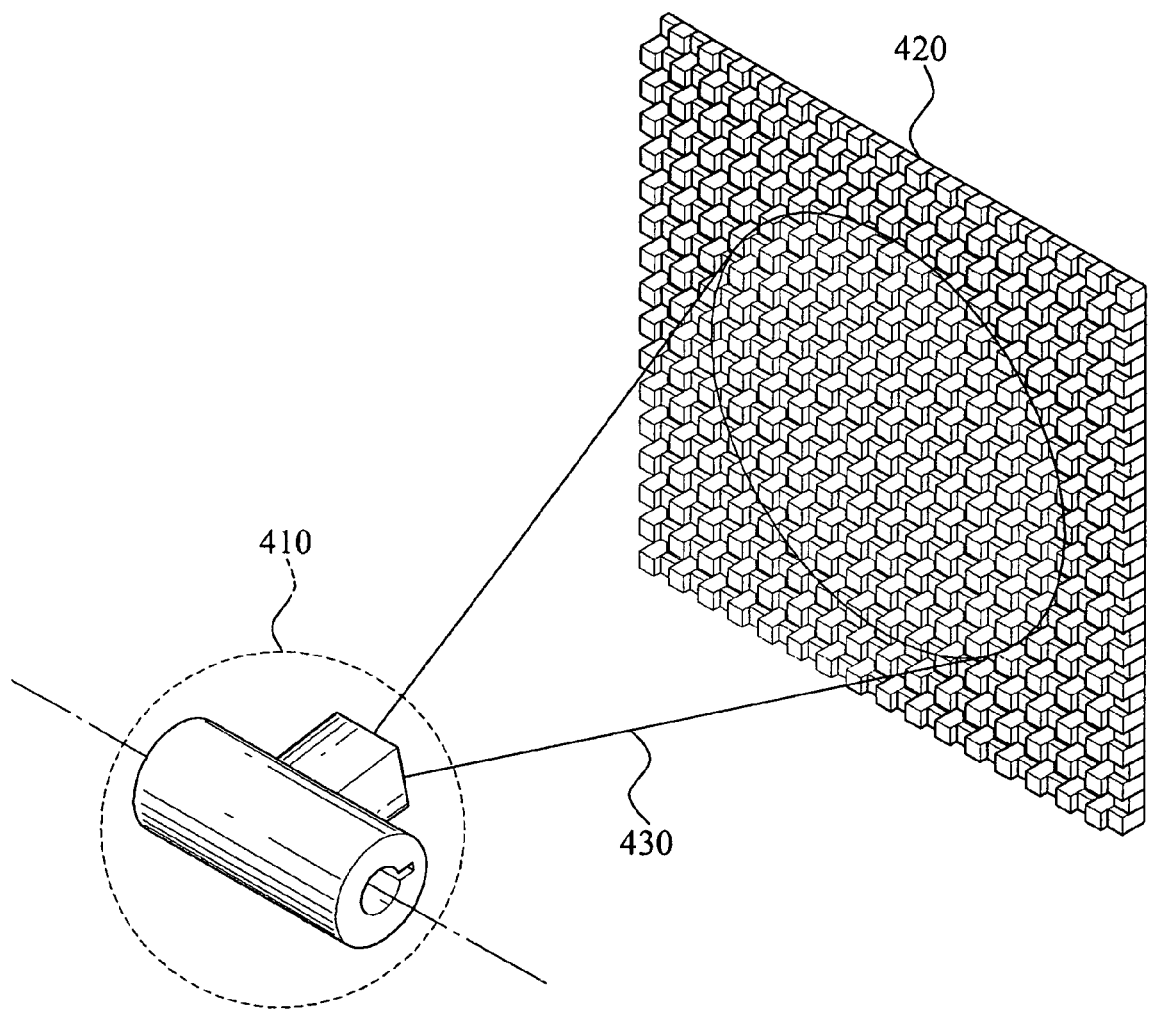
FIGS. 4 and 5 illustrate a radiation unit that sequentially radiates X-rays, according to one or more embodiments.
Figure 5:
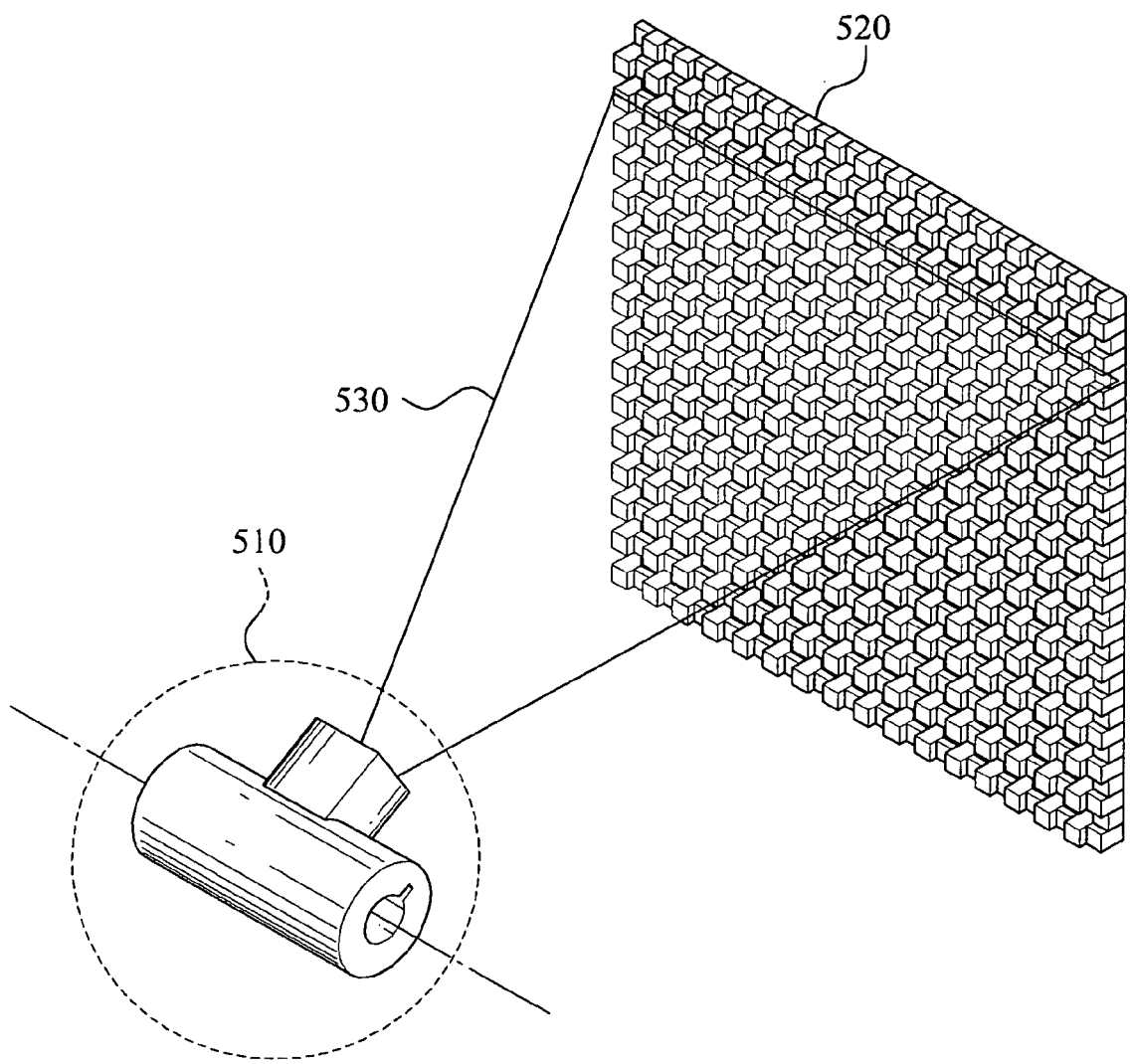

FIGS. 4 and 5 illustrate one or more of a radiation unit that sequentially radiates an X-ray.

As described above, X-ray radiated from the radiation units 410 and 510 may be one of a monochromatic X-ray, a narrow band X-ray, and a polychromatic X-ray, for example.

FIG. 4 illustrates an example of a radiating of an X-ray in a cone-beam shape, according to one or more embodiments.

That is, the radiation unit 410 radiates an X-ray 430 to a sensor unit 420 including a scintillator panel, and the shape of the X-ray 430 may be cone-beam shaped.

In this instance, the radiation unit 410 sequentially radiates a plurality of X-rays. The radiated plurality of X-rays may have different energy levels.

The sensor unit 420 may store pixel values of pixels respectively corresponding to the sequentially radiated X-rays. In an embodiment, an included image generating unit may generate an X-ray image of an object using the stored pixel values.

FIG. 5 illustrates an example of a radiating of an X-ray in a fan-beam shape, according to one or more embodiments.

The radiation unit 510 radiates an X-ray 530 to a sensor unit 520, and the radiated X-ray may be in fan-beam shaped. In this instance, the radiation unit 510 may sequentially radiate a plurality of X-rays having different energy levels, with the X-rays being radiated in row units, and with the row corresponding to a row of the scintillator panel included in the sensor unit 520, noting that alternatives are available.

In an embodiment, the radiation unit 510 may rotate based on a rotation axis and radiate the X-rays across the entire sensor unit 520.

In an embodiment, the radiation unit 510 may move up and down based on a vertical moving axis and radiate the X-rays in the fan-beam shape.

The sensor unit 520 may further store pixel values of pixels respectively corresponding to the sequentially radiated X-rays, and an included image generating unit may generate an X-ray image of an object using to stored pixel values.

Figure 6:
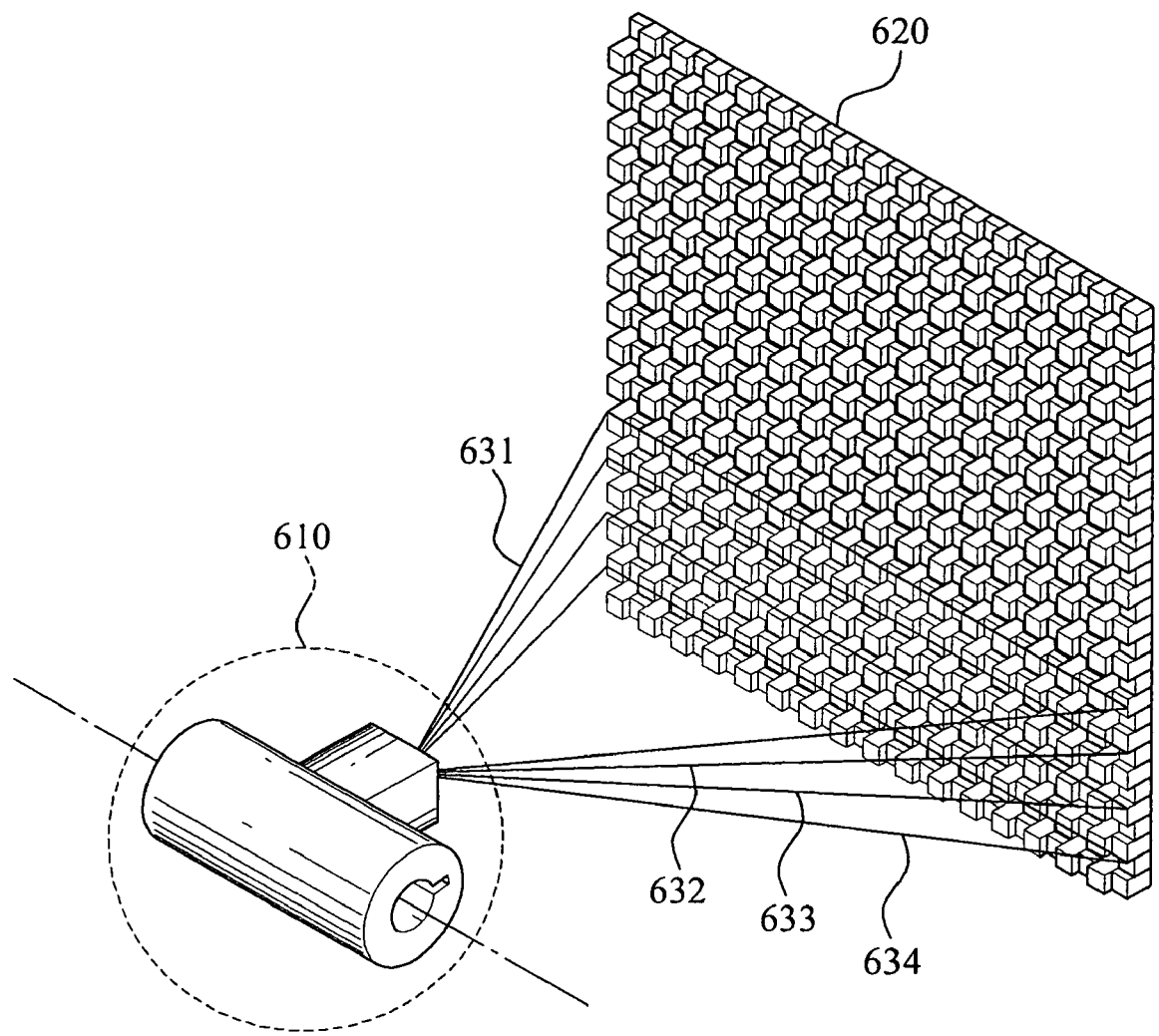
FIG. 6 illustrates a radiation unit that simultaneously radiates a plurality of X-rays, according to one or more embodiments.

FIG. 6 illustrates a radiation unit that simultaneously radiates a plurality of X-rays, according to one or more embodiments.

In this instance, radiated X-rays may be monochromatic X-rays, narrow band X-rays, or include both the monochromatic X-rays and the narrow band X-rays, for example.

In this embodiment, a radiation unit 610 simultaneously radiates the plurality of X-rays 631 through 634 having different energy levels to a sensor unit 620. As an example, FIG. 6 illustrates the case where four X-rays are radiated, noting that alternative numbers X-rays may be radiated.

For example, the number of X-rays to be used for generating an X-ray image may be greater than a number of X-rays that the radiation unit 610 may radiate at one time, so the radiation unit 610 may repeatedly perform simultaneous radiating of the plurality of X-rays. As an example, when the X-rays to be used for generating the X-ray image is 12, and the number of X-rays that the radiation unit 610 may radiate at a time is four, the radiation unit 610 may perform radiating of the four X-rays three times. Repetition of the radiation may be sequentially performed.

In an embodiment, the X-rays may be radiated in row units, with the row corresponding to a row of a scintillator included in the sensor unit 620. In this instance, the radiation unit 610 may rotate based on a rotation axis and radiate the X-rays, and also may move up and down based on a vertical moving axis and radiate the X-rays, noting that alternatives are available.

Referring again to FIG. 1, an X-ray image obtaining apparatus, according to one or more embodiments, will be described in further detail.

In the above description, the case where an X-ray image of an object is obtained by using a plurality of X-rays having different energy levels has been described. Hereinafter, the case where the X-ray image is obtained by radiating a single polychromatic X-ray will be described.

According to one or more embodiments, the radiation unit 110 may radiate a polychromatic X-ray to penetrate the object. In such a case, the sensor unit 120 may detect the polychromatic X-ray that penetrates the object.

As described above, the sensor unit 120 may include a scintillator panel that converts a plurality of X-rays that penetrate the object into measureable rays. In an embodiment, the sensor unit 120 may be divided into pixel blocks including a plurality of pixels, and the scintillator panel may further include a plurality of scintillator layers respectively corresponding to the plurality of pixels, for example, the scintillator layer having different layer characteristics. Here, each scintillator layer may have different layer characteristics.

Thus, an incident polychromatic X-ray on the scintillator panel may be converted into light by the scintillator layer. In an embodiment, when a scintillator layer corresponding to each of the pixels has different layer characteristics, the image generating unit 130 may generate a plurality of first X-ray images from the single polychromatic X-ray.

Again, as only an example, when the scintillator panel is included in a pixel block including four pixels as illustrated in FIG. 2, an incident polychromatic X-ray on a single pixel block may be converted into four identifiable types of light having different radiation intensities, by scintillator layers having different layer characteristics. Accordingly, in this example, the image generating unit 130 may generate four different first X-ray images, and generate the X-ray image of the object (a second X-ray image) from the four first X-ray images.

In an embodiment, the layer characteristic may include at least one of a thickness of the scintillator layer and a type of materials making up the scintillator layer, for example. Materials making up the scintillator layer may include at least one of CsI, CsI (Tl), $Gd_2O_2S(Tb)$, $Gd_2O_2S(Eu)$, $Y_2O_2S(Eu)$, $Y_2O_3(Eu)$, and a material containing garnet, noting that alternatives are available.

As an example, according to one or more embodiments, the plurality of pixels may respectively correspond to the plurality of first X-rays. That is, the number of pixels and number of first X-ray images may be the same, and the plurality of pixels may respectively correspond to the plurality of first X-rays.

In an embodiment, when the radiation unit 110 radiates the polychromatic X-ray, the radiated polychromatic X-ray may be in either a cone-beam shape or a fan-beam shape as illustrated in FIGS. 4 and 5, noting again that alternative embodiments are available.

Hereinafter, according to one or more embodiments, the case where an X-ray image obtaining apparatus 100 generates an X-ray Computed Tomography (XCT) image of the object will be further described.

First, in this example, the radiation unit 110 may radiate an X-ray from a plurality of angles, e.g., centering on the object. The X-ray radiated from the radiation unit 110 may be a plurality of X-rays having different energy levels, and may be a single polychromatic X-ray, noting that alternative embodiments are available.

In an embodiment, the radiation unit 110 may rotate, e.g., centering on the object, and radiate X-rays from the plurality of angles. In an embodiment, the radiation unit 110 may be fixed and radiate an X-ray and the object may be caused to rotate, centered on the radiation unit 110, for example. In this instance, the sensor unit 120 may detect X-rays that penetrates the object at the opposite side of the radiation unit 110 based on the object, for example.

In such an example, with the radiation unit 110 radiating the X-ray from the plurality of angles, centering on the object, the image generating unit 130 may generate the plurality of first X-ray images corresponding to a single pixel.

For example, when the radiation unit 110 rotates around the object and radiates the X-ray or when the radiation unit 100 radiates the X-ray and the object rotates, for example, the image generating unit 130 may obtain 360 first X-ray images corresponding to single a pixel in the object. For example, when a pixel block includes four pixels as illustrated in FIG. 2, 360 first X-ray images for each pixel may be generated, e.g., a first X-ray image for each degree of rotation, and thus the image generating unit 130 may obtain 1440 first X-ray images, 360 first X-ray images times four energies corresponding to pixels of the pixel block.

In this instance, the image generating unit 130 may reconstruct first X-ray images as a 3-dimensional (3D) image, with X-ray images being obtained from the plurality of angles for the object, and thereby obtain a first XCT image of the object. For example, when a scintillator panel included in the pixel block, e.g., including four pixels, is used as illustrated in FIG. 2, the image generating unit 130 may generate four first XCT images.

In this instance, the image generating unit 130 may generate a second XCT image of the object using the plurality of first XCT images.

As an example, the image generating unit may select a first XCT image from among the plurality of first XCT images, and use the selected first XCT image as the second XCT image, and then output the XCT image of the object.

In addition, the image generating unit 130 may select one or more first XCT images from among the plurality of the first XCT images, and combine the selected one or more first X-ray images to generate the second XCT image.

Further, the image generating unit 130 may select one or more first XCT images from among the plurality of first XCT images, and use a different image corresponding to the selected one or more first XCT images as the second XCT image, and then output the X-ray image of the object.

Figure 7:
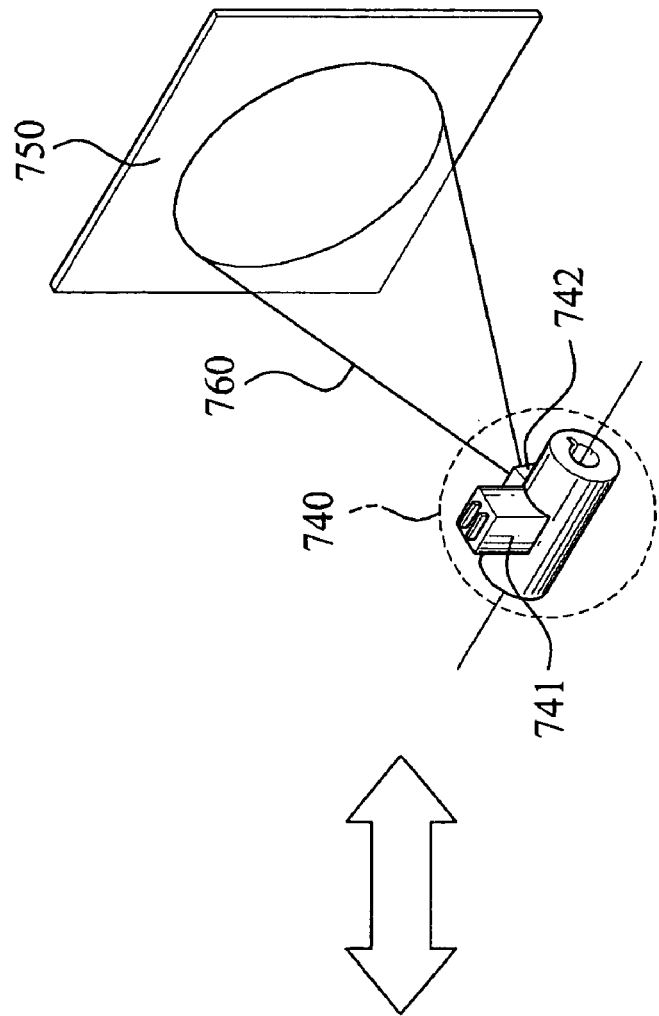
FIG. 7 illustrates an X-ray image obtaining apparatus, according to one or more embodiments.
Figure 7:
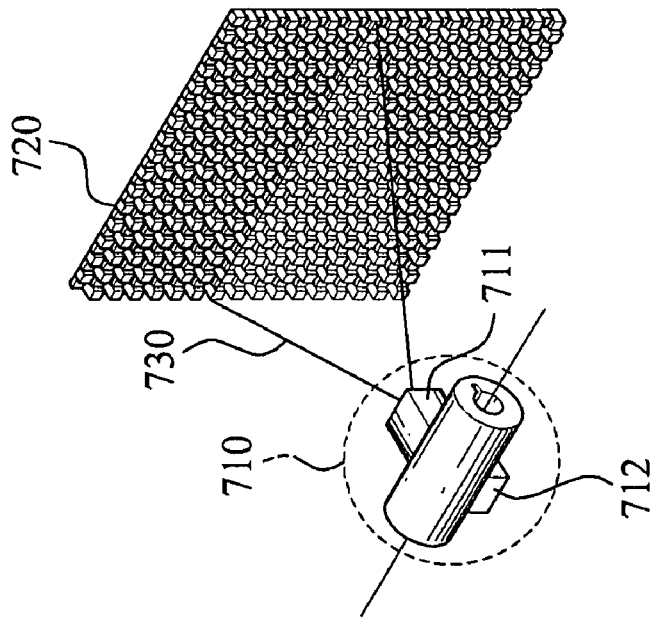

FIG. 7 illustrates an X-ray image obtaining apparatus, according to one or more embodiments.

An X-ray image obtaining apparatus according to one or more embodiments may include radiation units 710 and 740, radiating X-rays 730 and 760, sensor units 720 and 750 including a scintillator panel, and an image generating unit, for example.

The radiation units 710 and 740 may respectively include first radiation units 711 and 741 to radiate a plurality of first X-rays and respectively second radiation units 712 and 742 to radiate a polychromatic X-ray, for example.

Here, in this example, the sensor unit 720 may include a first scintillator panel, divided into pixel blocks including a plurality of pixels, and a second scintillator panel with even thickness between pixels in each pixel block. In this instance, the first scintillator panel and the second scintillator panel may include a plurality of scintillator layers respectively corresponding to the plurality of pixels, with the scintillator layers having different layer characteristics.

In an embodiment, the radiation unit 710 and the radiation unit 740 may be identical radiation units. That is, the first radiation unit 711 of the radiation unit 710 may be identical to the first radiation unit 741 of the radiation unit 740, and the second radiation unit 712 of the radiation unit 710 may be identical to the second radiation unit 742 of the radiation unit 740. Accordingly, in this embodiment, radiation units 710 and 740 may represent radiation unit configurations that are mutually convertible.

To generate an X-ray image, the radiation units 710 and 740 may radiate respective X-rays using one of the first radiation units 711 and 741 and the second radiation units 712 and 742, and the sensor units 720 and 750 may further detect corresponding X-rays that penetrate an example object, e.g., using one of the first scintillator panel and a second scintillator panel.

The first X-ray may include one of a monochromatic X-ray, narrow band X-ray, and polychromatic X-ray, for example.

According to one or more embodiments, the X-ray image obtaining apparatus may be selectively controlled to detect a plurality of the first X-rays using the first scintillator panel when the radiation unit 710 radiates the first X-ray through the first radiation unit 711, and selectively controlled to detect the polychromatic X-ray using the second scintillator panel when the radiation unit 740 radiates the polychromatic X-ray through the second radiation unit 742. Referring to FIG. 7, the first radiation units 711 and 741 and the second radiation units 712 and 742 may be part of a radiation source that radiates white light, for example, and an included controlling unit may control an X-ray filter and the like making up the first radiation units and the second radiation units to rotate. Accordingly, in this embodiment, one of the first radiation units 711 and 741 and the second radiation units 712 and 742 may be selected.

That is, the X-ray image obtaining apparatus, according to one or more embodiments, may selectively implement the first X-ray and the monochromatic X-ray to obtain the X-ray image by changing the scintillator panel included in the sensor unit depending on operating circumstances.

Hereinafter, according to one or more embodiments, a configuration of the sensor that may sense electromagnetic radiation rays will be further described. Here, as an example, the electromagnetic radiation rays may include X-rays.

In this instance, the sensor may be divided into pixel blocks, e.g., including/representing a plurality of pixels, with each of the pixels including a scintillator layer, for example.

Among the plurality of pixels making up the sensor, a first scintillator layer included in a first pixel may convert a first electromagnetic radiation spectrum into light, and a second scintillator layer included in a second pixel may convert a second electromagnetic radiation spectrum into light. The light converted by the first scintillator layer and the light converted by the second scintillator layer may have the same energy level or have different energy levels, for example.

In an embodiment, each of the plurality of pixels may only include a single scintillator layer. In addition, in an embodiment, the first scintillator layer and the second scintillator layer may be configured to not be overlapped, for example. When the first scintillator layer and the second scintillator layer respectively include a single scintillator layer, and the first scintillator layer and the second scintillator layer are not overlapped, the sensor according to one or more embodiments may operate similarly to the sensor unit of FIG. 3, for example. In this instance, the scintillator panel may include the first scintillator layer 321 and the second scintillator layer 322. Here, the first scintillator layer 321 may convert the electromagnetic radiation spectrum 310 into light 331, and the second scintillator layer 322 may convert electromagnetic radiation spectrum 310 into light 332.

In an embodiment, here may be more than one scintillator layer included in each pixel.

As only an example, each of the pixels may include two scintillator layers (double scintillator layer). When each of the pixels includes a plurality of scintillator layers, the plurality of scintillator layer included in the pixel may have the same characteristics (e.g., the thickness of each layer or type of materials making the layers) or have different such characteristics.

Further, according to one or more embodiments, the example first scintillator layer and second scintillator layer may have different thicknesses, similar to that demonstrated in FIG. 3, and also, according to one or more embodiments, the first scintillator layer and the second scintillator layer may be made up by different materials. In another embodiment, the first scintillator layer and the second scintillator layer may have the same thickness. Since descriptions of the thickness of the scintillator layer and materials making up the scintillator layer correspond to descriptions of a layer characteristic of the scintillator layer included in the scintillator panel of FIG. 1, further detailed description thereof will be omitted.

According to one or more embodiments, each of the plurality of pixels may further include a photoelectric transducer, for example, that may convert light into an electronic signal, and in an embodiment, the photoelectric transducer may include a photodiode.

According to one or more embodiments, and only as an example, each of the pixel blocks may include four pixels arranged as a 2×2. In this instance, the scintillator layer included in the sensor may have a configuration similar to that of the scintillator panel of FIG. 2, for example.

In an embodiment, each of the scintillator layers included in the example four pixels may convert different electromagnetic radiation spectrums into light. To perform the above, each of the scintillator layers included in the four pixels may have different thicknesses, and may be made up of different materials. As the materials making up the scintillator layer, CsI, CsI (Tl), Gd2O2S(Tb), Gd2O2S(Eu), Y2O2S(Eu), Y2O3(Eu), and a material containing garnet may be used, noting that alternative embodiments are available.

In one or more embodiments, in combination with the radiation unit, the sensor may be used as an imaging apparatus for obtaining an image of the object. In this instance, the radiation unit may radiate at least one electronic radiation spectrum.

Figure 8:
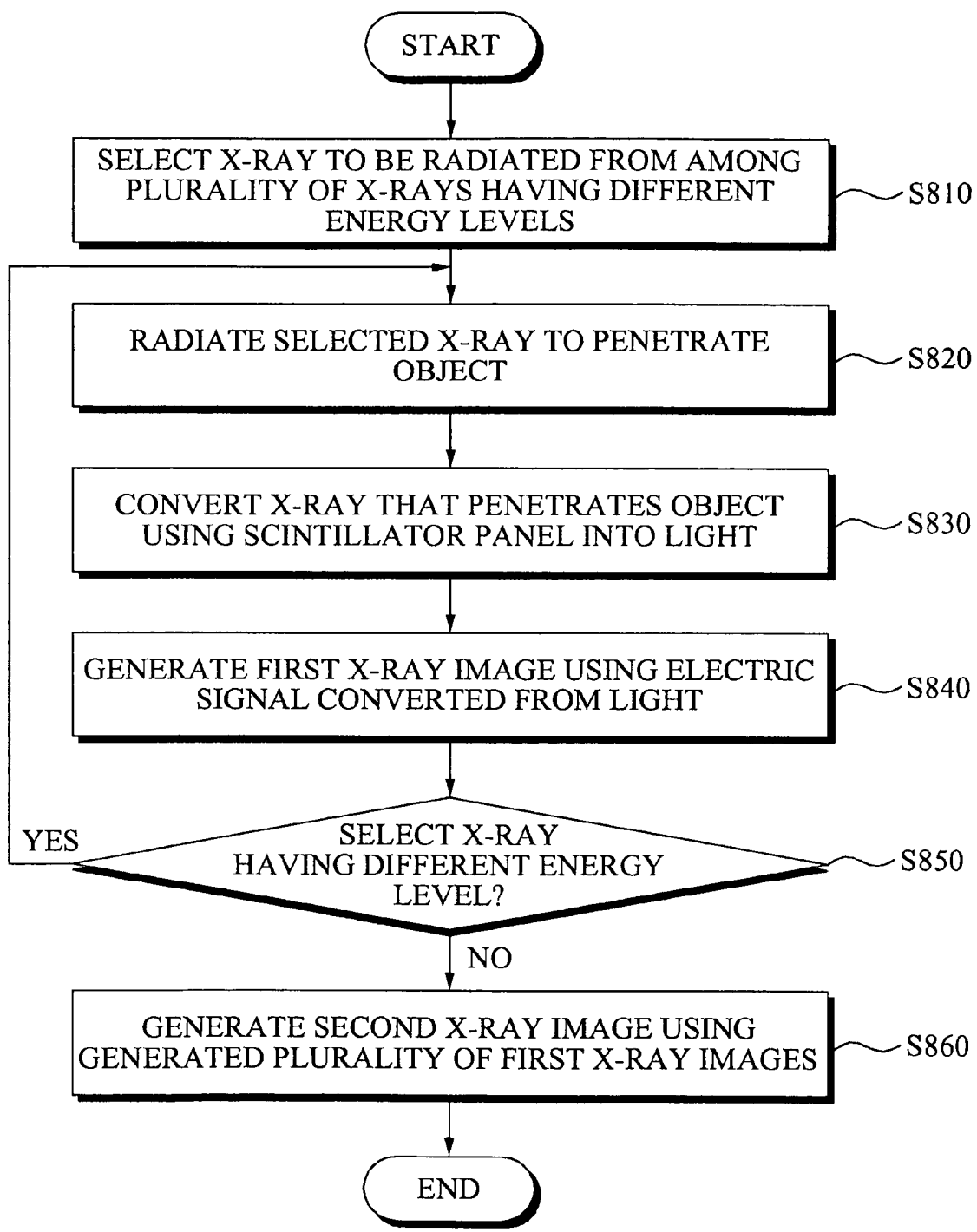
FIG. 8 illustrates an X-ray image obtaining method, according to one or more embodiments.

FIG. 8 illustrates an X-ray image obtaining method, according to one or more embodiments. Here, FIG. 8 illustrates a method for obtaining an X-ray image of an object using a plurality of X-rays having different energy levels.

An X-ray to be radiated may be selected, e.g., from among the plurality of X-rays having different energy levels, in operation S810.

According to one or more embodiments, a single X-ray may be selected or a plurality of X-rays may be selected, in operation S810.

Also, according to one or more embodiments, the X-ray may include at least one of a monochromatic X-ray, narrow band X-ray, and polychromatic X-ray, for example.

In operation S820, the selected X-ray may be radiated to penetrate the object. There may be more than one radiated X-ray. Also, depending on embodiment, the radiated X-ray may be in either a cone-beam shape or a fan-beam shape, for example. According to one or more embodiments, when the plurality of X-rays are selected, X-rays in fan-beam shape may be simultaneously radiated, for example, in operation S820.

In operation S830, an X-ray that penetrates the object may be converted into light using the scintillator panel. In this instance, the scintillator panel may have a plurality of scintillator layers respectively included in a plurality of pixels, and the scintillator layers respectively corresponding to the plurality of pixels may have different layer characteristics.

According to an embodiment, a thickness of a scintillator layer must have an appropriate thickness according to an energy level of the expected radiation ray, and also in such an embodiment the scintillator layer must be made of materials appropriate for an energy level of the expected incident radiation ray. According to one or more embodiments, the plurality of pixels respectively correspond to the plurality of X-rays, and characteristics of the scintillator layers respectively included in the plurality of pixels may be determined based on energy level of an X-ray corresponding to each of the pixels.

Also, according to one or more embodiments, the materials making up the scintillator layer may include at least one of CsI, CsI (Tl), $Gd_2O_2S(Tb)$, $Gd_2O_2S(Eu)$, $Y_2O_2S(Eu)$, $Y_2O_3$ (Eu), and a material containing garnet, noting that alternative embodiments are available.

In operation S840, a first X-ray image may be generated using the electronic signal converted from the light.

According to one or more embodiments, the plurality of pixels may respectively correspond to the plurality of X-rays, and first X-ray images may be generated based on an electronic signal of a pixel corresponding to each of the plurality of X-rays, in operation S840.

Further, according to one or more embodiments, the plurality of pixels may respectively correspond to the plurality of X-rays, and the first X-ray images may be based on the electronic signal of the pixel corresponding to each of the X-rays and electronic signals of a pixels adjacent to the pixel corresponding to each of the X-ray, in operation S840.

That is, depending on embodiment, the first X-ray images may be generated by only using an electronic signal of a pixel corresponding to the radiated X-ray or may be generated by using both the electronic signal of the corresponding pixel and electronic signals of an adjacent pixels, in operation S840.

In operation S850, there is a determination of whether an X-ray having a different energy level has been selected.

When an X-ray having a different energy level has been determined to have been selected, in the operation S850, operations S820 through S840 may be repeatedly performed. The X-rays selected in operation S810 may include X-rays selected in operation S850.

When a single X-ray is selected, respectively from operations S810 and S850, the selected X-rays may be sequentially radiated, for example.

According to one or more embodiments, the sequentially radiated X-rays may be in either a cone-beam shape or a fan-beam shape, for example.

In operation S860, a second X-ray image may be generated using the generated plurality of first X-ray images.

As only an example, a single first X-ray image from among the plurality of first X-ray images may be selected, and thus a second X-ray image may be generated, in operation S860. In addition, one or more first X-ray images from among the plurality of X-ray images may be selected, and the second X-ray image may be generated using the selected one or more first X-ray images, in operation S860. In addition, one or more first X-ray images from among the plurality of the first X-ray images may be selected, and the X-ray image of the object may be output based on a difference image of the selected one or more first X-ray images as the second X-ray image, in operation S860.

Figure 9:
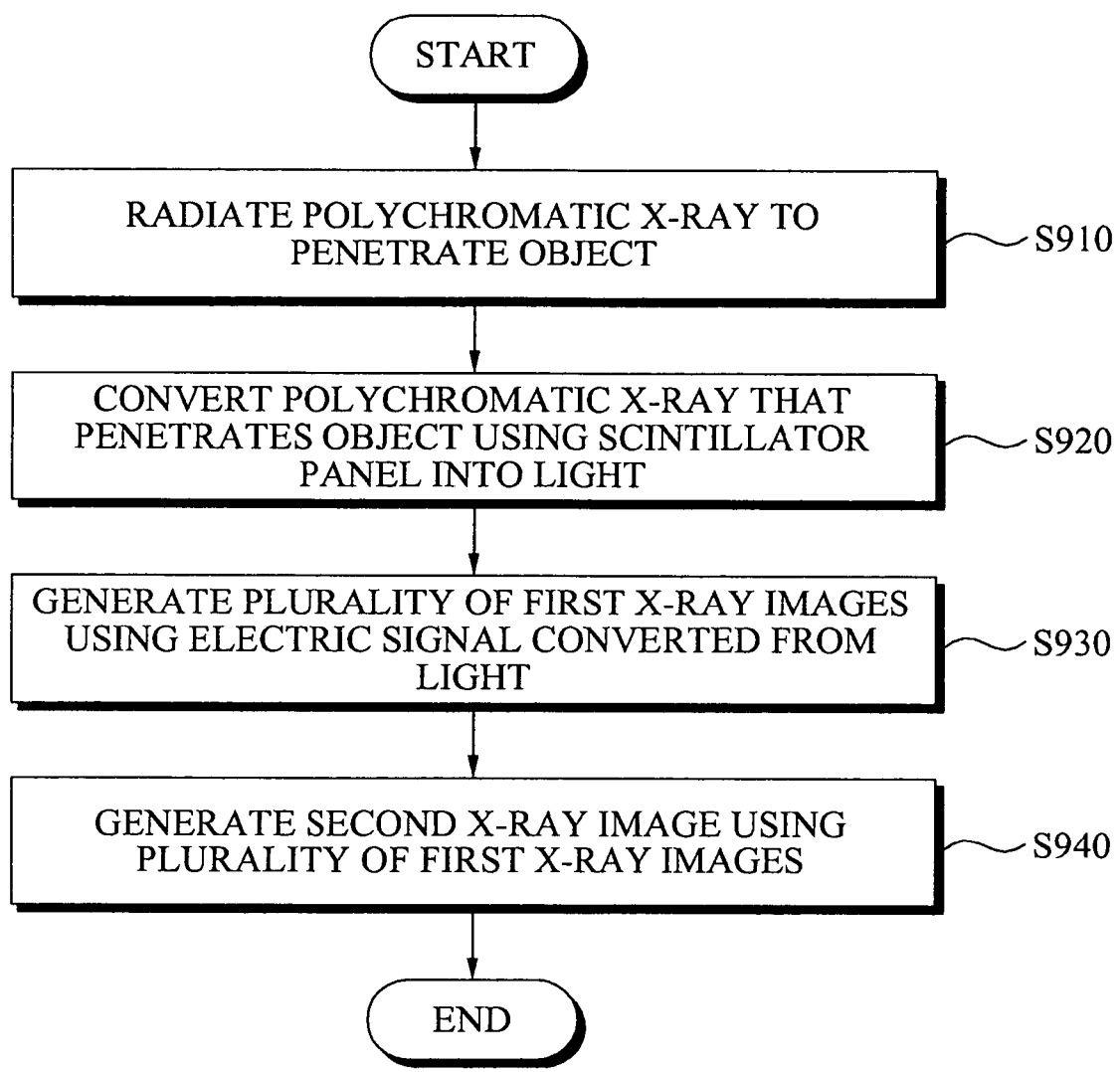
FIG. 9 illustrates an X-ray image obtaining method, according to one or more embodiments.

FIG. 9 illustrates an X-ray image obtaining method, according to one or more embodiments. Here, FIG. 9 illustrates a method for obtaining an X-ray image of an object using a single polychromatic X-ray, for example.

In operation S910, the polychromatic X-ray may be radiated to penetrate the object.

In operation S920, the polychromatic X-ray, e.g., which penetrates the object, is converted into light using a scintillator panel. As mentioned above, the scintillator panel may include a plurality of scintillator layers respectively included in a plurality of pixels, and the scintillator layer respectively corresponding to the plurality of pixels may have different layer characteristics, noting again that alternate embodiments are available.

In operation S930, a plurality of first X-ray images may be generated using electronic signals converted from the generated light.

In an embodiment, when the scintillator layers respectively of the pixels have different characteristic layers, the plurality of first X-ray images for the single polychromatic X-ray may be generated, in operation S930.

In an embodiment, the layer characteristic may include at least one of a thickness of the scintillator layer and a type of material making up the scintillator layer, and the materials making up the scintillator layer may include at least one of CsI, CsI (Tl), $Gd_2O_2S(Tb)$, $Gd_2O_2S(Eu)$, $Y_2O_2S(Eu)$, $Y_2O_3$ (Eu), and a material containing garnet, for example.

In operation S940, a second X-ray image may be generated using the generated plurality of first X-ray images.

In addition, according to one or more embodiments, the plurality of pixels may correspond to the plurality of first X-ray images, respectively, and the polychromatic X-ray radiated in operation S910 may be in either a cone-beam shape or a fan-beam shape, for example.

One or more embodiments regarding the X-ray image obtaining method have been shown and described above, and configurations of the X-ray image obtaining apparatus of FIG. 1 may be further applicable to one or more embodiments. Accordingly, further detailed descriptions thereof will be omitted.

The X-ray image obtaining method according to the above-described one or more embodiments may be implemented through at least one processing device and/or recorded in computer-readable media including instructions, e.g., computer readable code, to implement various operations, such as embodied by a computer or such an at least one processing device. The media may also include, alone or in combination with the instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of instructions include both machine code, such as produced by a compiler, and files containing higher level code that may be executed by the computer using an interpreter.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An X-ray image obtaining apparatus, the apparatus comprising:
   a sensor unit including a scintillator panel to generate light upon incidence of at least one X-ray, the sensor unit being divided into pixel blocks including a plurality of pixels, the scintillator panel includes a plurality of scintillator layers respectively corresponding to the plurality of pixels, and the scintillator layers have differing layer characteristics; and
   an image generating unit to generate a plurality of first X-ray images using an electronic signal transduced from the light, and generate a second X-ray image based on the plurality of first x-ray images.

2. The apparatus of claim 1, wherein the X-ray includes at least one of a monochromatic X-ray, a narrow band X-ray, and a polychromatic X-ray.

3. The apparatus of claim 1, wherein the differing layer characteristics include at least one of thickness of the scintillator layer and a type of material of the scintillator layer.

4. The apparatus of claim 3, wherein the material of the scintillator layer includes at least one of CsI, CsI (Tl), $Gd_2O_2S(Tb)$, $Gd_2O_2S(Eu)$, $Y_2O_2S(Eu)$, $Y_2O_3(Eu)$, and a material containing garnet.

5. The apparatus of claim 1, wherein the at least one X-ray includes plural X-rays with different energy levels, and the plurality of first X-ray images respectively correspond to the plural X-rays.

6. The apparatus of claim 5, wherein the plurality of pixels respectively correspond to the plural X-rays, and a layer characteristic of each of the plurality of scintillator layers is configured to correspond to an energy level of an X-ray incident to a respective pixel.

7. The apparatus of claim 5, wherein the plurality of pixels respectively correspond to the plural X-rays, and the image generating unit generates a first X-ray image based on an electronic signal derived from a pixel corresponding to a respective X-ray incident to the pixel.

8. The apparatus of claim 5, wherein the plurality of pixels respectively correspond to the plural X-rays, and the image generating unit generates a first X-ray image based on an electronic signal derived from a pixel corresponding to a respective X-ray incident to the pixel and an electronic signal derived from an adjacent pixel, adjacent to the pixel, corresponding to a respective X-ray incident to the adjacent pixel.

9. The apparatus of claim 1, further comprising:
a radiation unit to radiate the at least one X-ray toward an object,
wherein the scintillator panel generates light upon incidence of the at least one X-ray after irradiation of the object by the at least one X-ray.

10. The apparatus of claim 9, wherein the radiation unit sequentially radiates the at least one X-ray, with the radiated X-ray being in either a cone-beam shape or a fan-beam shape.

11. The apparatus of claim 9, wherein the radiation unit simultaneously radiates the plural X-rays, with the radiated plural X-rays being in a fan-beam shape.

12. The apparatus of claim 9, wherein the radiation unit radiates the at least one X-ray along a plurality of angles centered on the object.

13. The apparatus of claim 1, wherein the at least one X-ray includes a single polychromatic X-ray, and the plurality of pixels respectively correspond to the plurality of first X-ray images.

14. An X-ray image obtaining apparatus, the apparatus comprising:
a radiation unit to radiate X-rays toward an object, the radiation unit comprising a first radiation unit to radiate a plurality of first X-rays and a second radiation unit to radiate a polychromatic X-ray;
a sensor unit to detect the X-rays after irradiation of the object, the sensor unit including a first scintillator panel divided into pixel blocks including a plurality of pixels and a second scintillator panel, the second scintillator panel having even thicknesses for adjacent pixels, the first scintillator panel and the second scintillator panel including a plurality of scintillator layers respectively corresponding to each respective plurality of pixels, and the scintillator layers having differing layer characteristics; and
an image generating unit to generate an X-ray image of the object using the detected X-rays.

15. The apparatus of claim 14, wherein the first X-ray includes at least one of a monochromatic X-ray and a narrow band X-ray.

16. The apparatus of claim 14, wherein the differing layer characteristics include at least one of thickness of the scintillator layer, in at least the first scintillator panel, and a type of material making up the scintillator layer, in the first and second scintillator panels.

17. The apparatus of claim 14, further comprising a controlling unit to control a detection of the plurality of first X-rays using the first scintillator panel when the radiation unit radiates the plurality of first X-rays through the first radiation unit, and to control a detection of the polychromatic X-ray using the second scintillator panel when the radiation unit radiates the polychromatic X-ray through the second radiation unit.

18. An electromagnetic radiation sensing apparatus for obtaining an X-ray image, comprising:
a plurality of divided pixel blocks including a plurality of pixels, each of the plurality of pixels including a scintillator layer;
a first scintillator layer, included in a first pixel of the plurality of pixels, to generate light from an incident first electromagnetic emission spectrum; and
a second scintillator layer, included in a second pixel of plurality of pixels, to generate light from an incident second electromagnetic emission spectrum.

19. The apparatus of claim 18, wherein the first scintillator layer and the second scintillator layer are different thicknesses.

20. The apparatus of claim 18, wherein the first scintillator layer and the second scintillator layer are different materials.

21. The apparatus of claim 20, wherein the first scintillator layer and the second scintillator layer have same thicknesses.

22. The apparatus of claim 18, wherein each of the plurality of pixels further includes a photoelectric transducer to transduce light into an electronic signal.

23. The apparatus of claim 22, wherein the photoelectric transducer includes a photodiode.

24. The apparatus of claim 18, wherein each of the pixel blocks includes four pixels arranged in a 2×2 array form.

25. The apparatus of claim 24, wherein respective scintillator layers included in each of the four pixels are configured to generate light corresponding to different electromagnetic radiation spectrums.

26. The apparatus of claim 24, wherein respective scintillator layers included in each of the four pixels have different thicknesses.

27. The apparatus of claim 24, wherein respective scintillator layers included in each of the four pixels are different materials.

28. The apparatus of claim 18, wherein the first scintillator layer and the second scintillator are configured to not overlap.

29. The apparatus of claim 18, wherein each of the plurality of pixels includes a single scintillator layer.

30. The apparatus of claim 18, wherein the scintillator layer includes at least one of CsI, CsI (Tl), $Gd_2O_2S(Tb)$, $Gd_2O_2S$ (Eu), $Y_2O_2S(Eu)$, $Y_2O_3(Eu)$, and a material containing garnet.

31. An electromagnetic radiation sensing apparatus for obtaining an X-ray image, comprising:
a plurality of divided pixel blocks including a plurality of pixels, as a sensor unit, each of the plurality of pixels including a scintillator layer to generate light upon incidence of at least one X-ray, the scintillator panel including a plurality of scintillator layers respectively corresponding to the plurality of pixels, and the scintillator layers have differing layer characteristics of at least one of thickness of respective scintillator layers and type of materials of the respective scintillator layers.

32. An X-ray image obtaining apparatus, the apparatus comprising:
the sensor unit of claim 31, generating at least one first X-ray image from a transducing of light generated from the respective scintillator layers upon incidence of the at least one X-ray; and
an image generating unit to generate at least one second X-ray image based the at least one first X-ray image.

33. An imaging apparatus, comprising:
a radiation unit to radiate at least one electromagnetic radiation spectrum; and
a sensor, to sense the at least one radiated electromagnetic radiation ray, divided into pixel blocks including a plurality of pixels, each of the plurality of pixels includes a scintillator layer, with a first pixel of the plurality of pixels including a first scintillator layer that generates light upon incidence of a first electromagnetic radiation spectrum, and a second pixel of the plurality of pixels including a second scintillator that generates light upon incidence of a second electromagnetic radiation spectrum.

34. A method for obtaining an X-ray image, the method comprising:

generating at least one X-ray signal based on light generated from a scintillator panel divided into pixel blocks including a plurality of pixels respectively corresponding to each of plural scintillator layers of the scintillator panel having differing layer characteristics;

generating a plurality of first X-ray images based on the generated at least one X-ray signal; and generating a second X-ray image based on the plurality of first X-ray images.

35. The method of claim 34, wherein the scintillator panel is configured for an incident X-ray to include at least one of a monochromatic X-ray, a narrow band X-ray, and polychromatic X-ray.

36. The method of claim 34, wherein the differing layer characteristics include at least one of thickness of the scintillator layer and type of material of the scintillator layer.

37. The method of claim 36, wherein the material of the scintillator layer includes at least one of CsI, CsI (Tl), $Gd_2O_2S(Tb)$, $Gd_2O_2S(Eu)$, $Y_2O_2S(Eu)$, $Y_2O_3(Eu)$, and a material containing garnet.

38. The method of claim 36, wherein the at least one X-ray includes plural X-rays with different energy levels, and the plurality of first X-ray images respectively correspond to the plural X-rays.

39. The method of claim 38, wherein the plurality of pixels respectively correspond to the plural X-rays, and a layer characteristic of each of the plurality of scintillator layers is configured to correspond to an energy level of an X-ray incident to a respective pixel.

40. The method of claim 38, wherein the plurality of pixels respectively correspond to the plural X-rays, and the generating of the first X-ray images generates a first X-ray image based on an electronic signal derived from a respective X-ray incident to the pixel.

41. The method of claim 38, wherein the plurality of pixels respectively correspond to the plural X-rays, and the generating of the first X-ray images generates a first X-ray image based on an electronic signal derived from a pixel corresponding to a respective X-ray incident to the pixel and an electronic signal derived from an adjacent pixel, adjacent to the pixel, corresponding to a respective X-ray incident to the adjacent pixel.

42. The method of claim 34, further comprising:
radiating the at least one X-ray toward an object,
wherein the plurality of the first X-ray images are generated based on generated X-ray signals generated after irradiation of the object by the at least one X-ray.

43. The method of claim 42, wherein the radiating of the at least one X-ray sequentially radiates the at least one X-ray, with the radiated X-ray being in either a cone-beam shape or a fan-beam shape.

44. The method of claim 42, wherein the radiation of the at least one X-ray includes simultaneously radiating plural X-rays in a fan-beam shape.

45. The method of claim 34, wherein the at least one X-ray includes a single polychromatic X-ray, and the plurality of pixels respectively correspond to the plurality of first X-rays.

46. A computer readable recording medium comprising computer readable code to control at least one processing device to implement the method of claim 34.

* * * * *

UNITED STATES PATENT AND TRADEMARK OFFICE
CERTIFICATE OF CORRECTION

PATENT NO. : 7,929,665 B2
APPLICATION NO. : 12/453117
DATED : April 19, 2011
INVENTOR(S) : Dong-Goo Kang et al.

It is certified that error appears in the above-identified patent and that said Letters Patent is hereby corrected as shown below:

Column 16, Line 38, In Claim 1, delete "x-ray" and insert --X-ray--, therefor.

Column 18, Line 38, In Claim 31, delete "layer" and insert --panel--, therefor.

Signed and Sealed this
Third Day of January, 2012

David J. Kappos
*Director of the United States Patent and Trademark Office*